Figure 1:
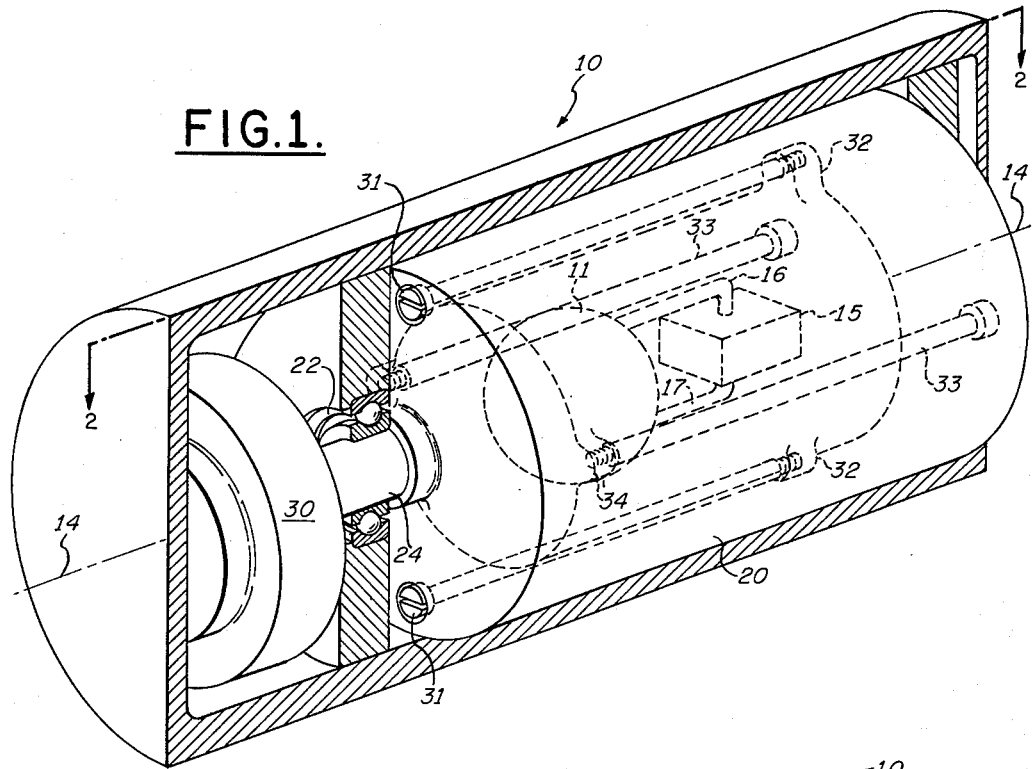

Aug. 17, 1965 W. G. WING 3,200,653
THERMAL GRADIENT COMPENSATING DEVICE
Filed Aug. 20, 1962

INVENTOR.
WILLIS G. WING
BY
ATTORNEY

United States Patent Office 3,200,653
Patented Aug. 17, 1965

3,200,653
THERMAL GRADIENT COMPENSATING DEVICE
Willis G. Wing, Glen Head, N.Y., assignor to Sperry Rand Corporation, Great Neck, N.Y., a corporation of Delaware
Filed Aug. 20, 1962, Ser. No. 218,181
4 Claims. (Cl. 74—5)

This invention relates to a device for attenuating temperature gradients within an enclosure. The invention is particularly applicable to attenuating thermal gradients appearing within a fluid used as the sensitive element of an inertial device such as a gyroscope or accelerometer.

The invention will be explained for purposes of example with respect to a gyroscope having a fluid rotor sensitive element of the type disclosed in U.S. patent application 3,957, entitled "Fluid Rotor Gyroscopic Apparatus," filed January 21, 1960, issued October 16, 1962 as U.S. Patent No. 3,058,359 and invented by the same inventor as the present invention. In a gyroscope of this type, an output signal is provided when the spin axis of the fluid and that of the cavity within which the fluid is contained are not coincident due to external rotation of the gyroscope. The output signal is representative of the angular difference between the spin axes and is measured as a change in differential pressure in a manner more fully explained in the aforementioned application. When there is an axial temperature difference existing in the fluid which forms the sensitive element, the output signal is in error by what appears to be an apparent drift when an acceleration is present. The source of the problem is the axial temperature gradient which causes a density variation in the fluid and a consequent unbalance of the sensitive element.

The problem is aggravated when the gyroscopic device is located in an environment in which temperature gradients exist external to the device. Prior art solutions to undesirable temperature gradients existing in a fluid caused primarily by temperature gradients existing external to the device are more fully discussed in U.S. application 26,029, now Patent No. 3,129,755, entitled "Temperature Gradient Attenuating Device," filed May 2, 1960 in the name of Gould et al.

Another prior art solution is disclosed in U.S. Patent No. 2,973,647, entitled "Accelerometers," issued March 7, 1961 to H. J. Smith and the present inventor.

The problem is particularly aggravated by asymmetrical heat sources and heat sinks within the device itself which for one reason or another cannot be symmetrically arranged to thereby eliminate the undesirable axial temperature gradients.

It is a primary object of the present invention to provide a device for attenuating temperature gradients along a predetermined axis.

It is a further object of the present invention to provide a device for attenuating temperature gradients with respect to a sensitive element for substantially eliminating said gradients with respect to said element.

It is another object of the present invention to provide a device for attenuating temperature gradients within a sensitive element which can cause unbalance of said element.

The above objects are achieved by a device for attenuating temperature gradients within a sensitive element along a predetermined axis by means of a plurality of high thermal conductivity members extending along, i.e. parallel to, said axis for a distance at least approximately equal to the dimension of said sensitive element along said axis whereby the thermal conductance through the paths defined by the high conductivity members causes a heat transfer that substantially eliminates temperature gradients along said axis through said sensitive element.

Figure 2:
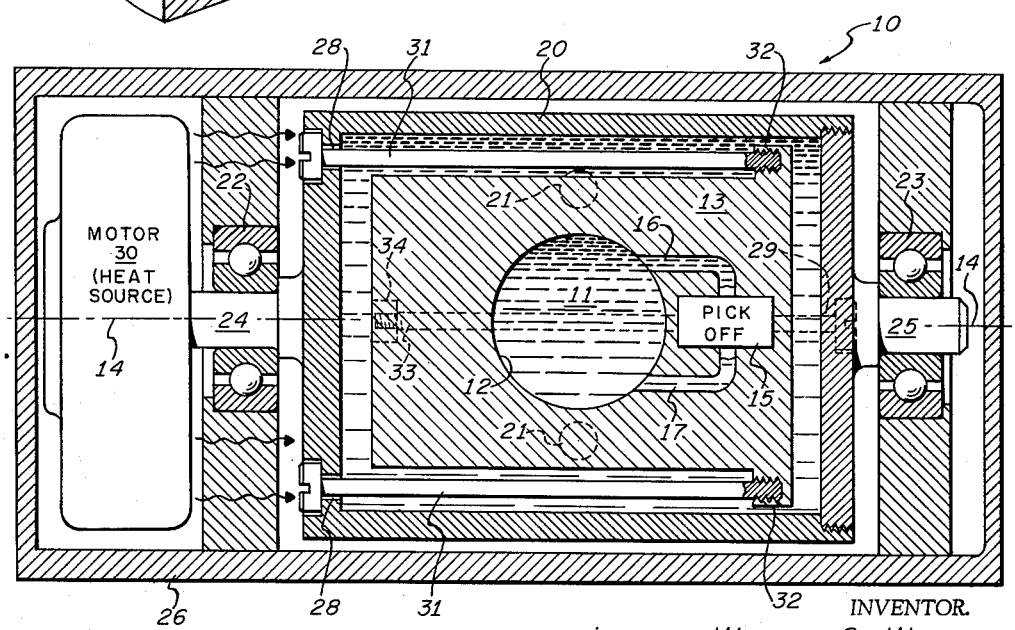

Referring to the drawings,

FIG. 1 is an isometric view partly in section of a gyroscope including the temperature gradient attenuating means of the present invention, and FIG. 2 is a vertical section through FIG. 1 taken along lines 2—2.

For purposes of example the present invention will be applied to a gyroscope of the type shown in said U.S. Patent No. 3,058,359, although it will be appreciated that it is equally applicable to maintaining uniform temperatures along a predetermined axis throughout enclosures generally.

Referring to the drawings, a gyroscope 10 has a sensitive element 11 comprising a fluid sphere contained within and defined by a spherical cavity 12 in a hollow cylindrical container 13. The spin axis of the fluid sphere sensitive element 11 normally coincides with the longitudinal axis 14 of the gyroscope 10. A pick-off means 15 communicates by means of conduits 16 and 17 with the cavity 12 in order that the pick-off means 15 provides an output signal proportional to the rate and direction of the external rotation of the gyroscope 10 in accordance with the change in differential pressure within the fluid as more fully described in the aforementioned U.S. Patent No. 3,058,359.

The container 13 is coaxially mounted in spaced relation within a hollow cylindrical housing 20. The container 13 has an exterior diameter that is smaller than the interior diameter of the housing 20 to form a space therebetween. The container 13 is supported in the housing 20 by means of symmetrically disposed balls 21 which may be located for example 120° apart. The balls 21 provide a central support and also provide a centralized thermal path to aid in the elimination of thermal gradients.

The space between the container 13 and the housing 20 is filled with a fluid which in certain instances may be a gas such as ambient air or in other instances where it is desirable to float the container 13, the space is filled with a flotation liquid. To provide for expansion and contraction of the fluid within the space with temperature variation, conventional diaphragms which are not shown for purposes of simplicity may be utilized.

The housing 20 is journalled in spaced ball bearings 22 and 23 by means of shafts 24 and 25 respectively which extend coaxially with the axis 14 from opposite sides of the housing 20 in order to permit it to rotate about the axis 14. The bearings 22 and 23 are in turn mounted on an outer housing 26 which forms an enclosure for the gyroscopic apparatus 10 and also provides a mounting support for mounting the gyroscope 10 upon the vehicle whose movement is to be measured. The housing 20 and all the elements therein are rotated around the axis 14 by means of a motor 30 connected to the shaft 24.

The motor 30 is a source of heat which causes heat flow in the direction of the wavy arrows within the housing 26. This asymmetrical source of heat in the absence of the present invention would cause the temperature at the left side of the gyroscope 10 as viewed in the drawing to be higher than the temperature on the right side thereof. This creates a temperature gradient along the axis 14 which would tend to displace the center of gravity of the fluid sensitive element 11 to the right, i.e. towards the more dense cooler portion of the fluid. When an acceleration is present this would cause a drift precession of the fluid body.

In order to overcome the axial temperature gradient caused by the heat from the motor 30, a first plurality of high thermal conductivity elongated bolts 31 protrude through respective holes 28 in the left side of the housing 20 and connect to respective lugs 32 on the right end of the container 13. The bolts 31 extend in an axial direction within the fluid in the space between the container 13 and the housing 20. A second plurality of elongated bolts 33 protrude through respective holes 29 in the right side of the housing 20 and connect to respective lugs 34 on the left side of the container 13. The bolts 33 also extend in the direction of the axis 14 within the fluid between the container 13 and the housing 20. Suitable sealing means, not shown, are provided where the bolts 31 and 33 protrude through the holes 28 and 29 respectively in the housing 20 to prevent leakage of the fluid.

The operation of the gyroscopic apparatus including the present invention will now be described. The fluid sphere sensitive element 11 exhibits gyroscopic effects due to the angular momentum associated with the fluid element when the cavity 12 is rotated. In the absence of angular rates about axes perpendicular to the cavity axis of rotation 14, viscous effects will cause the body of fluid to rotate about this same axis and at the same angular speed as the container 13. This produces a pressure distribution on the inside of the spherical cavity 12 which is symmetrical with respect to its axis of rotation 14.

When an angular rate is imposed on the gyroscope 10 about an axis perpendicular to the cavity axis of rotation 14 due to movement of the vehicle upon which the gyroscope 10 is mounted, the momentum of the fluid causes a torque which misaligns the spin axis of the fluid with respect to the spin axis 14 of the cavity 12. This torque is opposed by the previously noted viscous effects, so that in the steady state a constant angular difference in the cavity spin axis 14 and the fluid spin axis exists as a result of such a constant angular rate input. This angular difference in the axes of rotation produces a pressure distribution on the inside surface of the cavity 12 that is no longer symmetrical with respect to the cavity axis 14 which is sensed by the pick-off 15. The pick-off 15 provides an output signal having an amplitude and phase representative of the rate and direction of movement of the vehicle.

If the center of gravity of the fluid sphere sensitive element 11 is not centered within the spherical cavity 12 due to axial temperature gradients caused by asymmetrical heat sources such as the motor 30, the output signal from the pick-off 15 is erroneous when the device experiences an acceleration. By means of the present invention, however, a portion of the heat from the motor 30 located on the left side of the container 13 is conducted by the high thermal conductivity bolts 31 to the right side of the container 13. The bolts 31 define a path of high thermal conductivity and they are so constructed and arranged as to conduct a portion of the heat from the motor 30 through the bolts 31 to the lugs 32 on the right side of the container 13 in order that the temperature at the right side of the spherical cavity 12 is the same as that on the left side of the cavity 12. In a similar manner, the bolts 33 provide a thermal conducting path from the right side of the housing 20 to the left side of the container 13.

While the number and cross sectional area of the bolts 31 and 33 necessary to achieve this optimum condition can be approximated by mathematical calculations, as a practical matter the exact size and number of bolts 31 and 33 required are determined empirically by use of a test model. Generally, it is desirable to have the diameters of the bolts slightly larger than necessary during the initial testing in order that their diameters can be easily reduced to provide exactly the proper thermal conductance to maintain the center of gravity of the fluid element 11 centered.

Preferably the bolts 31 and 33 are symmetrically displaced around the circumference of the container 13. Further, the fluid through which the bolts 31 and 33 extend may be liquid or gas at nominal or reduced pressure but in any case in order for the bolts 31 and 33 to define a thermal conducting path, the thermal conductivity of the bolts 31 and 33 must be greater than that of the surrounding fluid.

While the form of the high thermal conductivity members has been described as bolts 31 and 33, many other structural forms are obviously suitable. For example, if it is desired to attenuate distributed thermal gradients acting radially as well as lumped heat sources creating axial thermal gradients, the high thermal conductivity members may be in the form of arcuate shaped elongated members substantially surrounding the container 13.

It will be obvious now that the theory and structure of the present invention have been described that it is also applicable to devices of the type shown in the aforementioned U.S. Patent No. 2,973,647.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. In combination,
   (1) means having a sensitive element for providing an output signal whereby temperature gradients along a predetermined axis through said sensitive element cause errors in said output signal,
   (2) containing means for containing said sensitive element,
   (3) hollow housing means in spaced relation surrounding said containing means, and
   (4) a plurality of high thermal conductivity members connected between said housing means and said containing means and extending along said predetermined axis within the space between said containing means and said housing means for a distance at least approximately equal to the dimension of said sensitive element along said predetermined axis,
   (5) said members being so constructed and arranged that temperature gradients along said predetermined axis through said sensitive element are substantially eliminated.

2. In combination,
   (1) an inertial device having a sensitive element for providing an output signal whereby temperature gradients along a predetermined axis through said sensitive element cause errors in said output signal,
   (2) containing means for containing said sensitive element,
   (3) hollow housing means in spaced relation surrounding said containing means, and
   (4) a plurality of high thermal conductivity members connected to said housing means and said containing means and extending along said predetermined axis within the space between said containing means and said housing means for a distance at least approximately equal to the dimension of said sensitive element along said predetermined axis,
   (5) said members being symmetrically disposed with respect to said sensitive element and being so constructed and arranged that temperature gradients along said predetermined axis through said sensitive element are substantially eliminated.

3. In combination,
   (1) an inertial device having a sensitive element for providing an output signal whereby temperature gradients along a predetermined axis through said sensitive element cause errors in said output signal,
   (2) containing means for containing said sensitive element and having first and second ends,
   (3) hollow housing means in spaced relation surrounding said containing means, said housing means having first and second ends adjacent said first and second ends of said containing means respectively,
   (4) a low thermal conductivity fluid disposed between said containing means and said housing means,
   (5) a first plurality of high thermal conductivity members extending parallel to said predetermined axis within said low thermal conductivity fluid and connected between said first end of said containing means and said second end of said housing means, and (6) a second plurality of high thermal conductivity members extending parallel to said predetermined axis within said low thermal conductivity fluid and connected between said second end of said containing means and said first end of said housing means, (7) said members being so constructed and arranged that temperature gradients along said predetermined axis through said sensitive element are substantially eliminated.

4. In combination, (1) an inertial device having a sensitive element in the form of a fluid for providing an output signal whereby temperature gradients along a predetermined axis through said fluid cause errors in said output signal, (2) containing means for containing said sensitive element having first and second external ends, (3) a hollow housing in spaced relation surrounding said containing means said housing having first and second internal ends adjacent said first and second external ends of said containing means respectively, (4) a low thermal conductivity fluid disposed between said containing means and said housing, (5) a first plurality of high thermal conductivity members extending parallel to said predetermined axis within said low thermal conductivity fluid and connected between said first external end of said containing means and said second internal end of said housing, and (6) a second plurality of high thermal conductivity members extending parallel to said predetermined axis within said low thermal conductivity fluid and connected between said second external end of said containing means and said first internal end of said housing, (7) said members being so constructed and arranged that temperature gradients along said predetermined axis through said sensitive element are substantially eliminated.

No references cited.

BROUGHTON G. DURHAM, *Primary Examiner.*